United States Patent [19]

Antoine et al.

[11] Patent Number: 5,299,128
[45] Date of Patent: Mar. 29, 1994

[54] METHOD AND APPARATUS FOR DELINEATING BED BOUNDARIES IN SUBSURFACE FORMATIONS AND FOR PRODUCING INDICATIONS OF THE ANGLE OF DIP THEREOF

[75] Inventors: Jean-Noël Antoine, Houston, Tex.; Jean-Pierre Delhomme, Boulogne Billancourt; Hervé Ganem, Villejuif, both of, France

[73] Assignee: Schlumberger Technology Corporation, Richfield, Conn.

[21] Appl. No.: 593,109

[22] Filed: Oct. 5, 1990

[51] Int. Cl.5 .......................... G01V 1/00; G06K 9/46
[52] U.S. Cl. ...................................... 364/422; 367/68; 73/152
[58] Field of Search ................ 364/421, 422; 73/152, 73/153; 367/68, 69, 38, 25, 28

[56] References Cited

U.S. PATENT DOCUMENTS

| | | | |
|---|---|---|---|
| 4,251,773 | 2/1981 | Callaiu et al. | 324/347 |
| 4,316,250 | 2/1982 | Vincent | 364/422 |
| 4,468,623 | 8/1984 | Gianzero et al. | 324/367 |
| 4,523,148 | 6/1985 | Maciejewski | 324/351 |
| 4,567,759 | 2/1986 | Ekstrom et al. | 73/152 |
| 4,638,254 | 1/1987 | Uhri | 324/323 |
| 4,745,550 | 5/1988 | Witkin et al. | 364/422 |
| 4,791,618 | 12/1988 | Pruchnik | 367/25 |
| 4,909,075 | 9/1990 | Flaum et al. | 73/152 |
| 4,916,616 | 4/1990 | Freedman et al. | 364/422 |
| 4,942,528 | 7/1990 | Kerzner | 364/422 |
| 5,038,378 | 8/1991 | Chen | 382/1 |

OTHER PUBLICATIONS

M. Kass et al., "Analyzing oriented patterns" Computer Vision, Graphics and Image Processing, 37, 362-385 (1987).
P. J. Burt, "The pyramid as a structure for efficient computation", in Multiresolution Image Processing and Analysis (A. Rosenfeld, ed.) Springer-Verlag, Berlin, 1984, pp. 6-35.
P. Vincent et al., "An approach to detailed dip determination using correlation by pattern recognition," Journal of Petroleum Technology, Feb. 1979, pp. 232-240.
J. C. Trouiller et al., "Thin-bed reservoir analysis from borehole electrical images," SPE paper 19578, presented at the 64th Annual Technical Conference and Exhibition of the Society of Petroleum Engineers, San Antonio, Tex., Oct. 8-11, 1989.

Primary Examiner—Roy N. Envall, Jr.
Assistant Examiner—A. Bodendorf
Attorney, Agent, or Firm—Synnestvedt & Lechner

[57] ABSTRACT

Data representing a two-dimensional image of the resistivity of a sector of a borehole wall is processed to produce selected flow-line data delineating the boundaries of beds of subsurface earth formations along sectors of the borehole. The latter bed-delineating image data for several circumferentially-spaced sectors is further processed to derive and present data defining the orientations of dip planes, by matching the bed-delineating flow-lines for the several sectors. This is done by focusing the latter flow-lines on a root flow-line, correlating those flow-lines to the root flow-line, and linking the flow-lines to the root flow-line according to a path of minimum cumulative cost.

22 Claims, 14 Drawing Sheets (1,2) (1,3) (1,4) (1,5) (1,6) (1,7)
(2,4) (2,5) (2,6) (2,7) (2,8)
(3,4) (3,5) (3,6) (3,7) (3,8)
(4,6) (4,7) (4,8)
(5,6) (5,7) (5,8)
(6,8) (7,8)

METHOD AND APPARATUS FOR DELINEATING BED BOUNDARIES IN SUBSURFACE FORMATIONS AND FOR PRODUCING INDICATIONS OF THE ANGLE OF DIP THEREOF

FIELD OF THE INVENTION

This invention relates to a method and apparatus for delineating boundaries of beds in subsurface earth formations traversed by a borehole, and also for the geometrical characterization of the beds according to their dip planes.

BACKGROUND OF THE INVENTION

Conventional techniques for characterizing the geometry of bed boundaries rely on dipmeter logging tools such as the Stratigraphic High Resolution Dipmeter Tool(SHDT) of Schlumberger, disclosed in U.S. Pat. No. 4,251,773 of Michel Cailliau Asnieres and Philippe Vincent, issued Feb. 17, 1981. This dipmeter tool has four pads equiangularly distributed about the axis of the tool and adapted to engage the borehole wall at 90° intervals. Each pad carries electrical sensors which yield resistivity measurements pertaining to the respective sectors of the borehole wall engaged by the pads. As the tool is moved along the borehole wall, the sensors continuously measure the resistivity of the adjacent formation, and logs are produced which show the variations in resistivity along the longitudinal direction of the borehole. Sharp variations in resistivity indicate boundaries between different beds in the earth formation. The logging data produced by the pads at the different angular positions of the pads are processed to provide information as to the dip of bed boundaries, i.e., the orientations of the bed boundaries with respect to a terrestrial reference. Known techniques include the correlation of the resistivity data from the several pads, as described in the above-identified patent.

A major advance in borehole logging technique has been the development by Schlumberger of the Formation Microscanner ("FMS"), a borehole imaging system. This system uses a tool having wall-engaging pads each carrying a dense array of electrical sensors distributed in the circumferential direction with respect to the borehole. The voltages at these sensors are sampled electrically as the tool moves along the borehole, to produce image data in electrical form which can be processed and rendered visible, as by photographic print-out or cathode-ray tube display for example, thereby forming a two-dimensional visible image of the resistivity over the logged segments of the borehole walls. Because of the high density of sensors in the circumferential direction, and the high rate of sampling in the longitudinal direction, the images thus obtained exhibit a resolution on the order of 0.5 cm, allowing very fine details of the formation to be distinguished. The FMS and associated processing techniques are described in U.S. Pat. Nos. 4,468,623 of Stanley C. Gianzero, David E. Palaith and David S.K. Chan, issued Aug. 28, 1984, and U.S. Pat. No. 4,567,759 of Michael P. Ekstrom and David S.K. Chan, issued Feb. 5, 1986. In such images, bed boundaries can be visually identified, since the sharp changes in resistivity at boundaries of the beds translate into sharp visible contrasts in the images.

An object of the present invention is to provide new and useful method and apparatus for processing borehole image data to produce data delineating bed boundaries.

Another object is to derive, from borehole image data, dip information with respect to the planes of the beds.

SUMMARY OF THE INVENTION

These and other objects of the invention are achieved by the provision of method and apparatus which respond to image data representative of variations in a physical parameter of an earth formation over a sector of a borehole wall to produce a field of flow-line data, and which select from this field of flow-line data a subset of flow-line data corresponding to the boundaries of beds in the earth formation. This subset of flow-line data may be displayed in a two-dimensional visual image of said parameter, and may be used also to achieve a match between image data derived for different circumferentially spaced-apart sectors of the borehole wall.

Preferably the above-mentioned field of flow-line data is produced by (a) forming gradient vector data corresponding to the partial derivatives of the original image data, with respect to variations along the x and y directions, where y is the direction longitudinal of the borehole and the x direction is the direction circumferential of the borehole; (b) deriving therefrom a set of data representing tangent vectors orthogonal to the gradient vectors; and (c) constructing from said set of tangent vector data a field of flow-lines having as their tangent, at every point, said tangent vectors.

Selection of the subset of most significant field lines is preferably accomplished by application of a "significance" criterion to the flow-line data, which in effect eliminates those flow-lines of lesser significance while retaining only those suitable as "bright line" delineations of bed boundaries. These bright lines may, if desired, be superimposed on the original two-dimensional image as an aid to an investigator viewing the image.

Preferably also, the "bright lines" delineating bed boundaries are used in matching the images obtained for different sectors of the borehole, not only as an aid in presenting a meaningful image to the expert viewer, but also to enable automatic derivation of data as to dip of the planes of the beds. The preferred methods for accomplishing this are as follows:

Matching provided in accordance with the present invention determines the best possible candidates for matching a single given flow-line on a single given image in a set of images which as heretofore not been adequately accomplished in the well-boring art. Further in accordance with the present invention symmetric matching is accomplished which allows expedient determination of this dip of subsurface formations. Methods provided in accordance with the present invention for matching flow-lines in multiple images comprise the steps of focusing a first flow-line in one of the images on flow-lines in the other images to determine the average dipping plane of the formation, correlating flow-lines in the image to the first flow-line based on a resistivity profile determined for each image in the set of multiple images, and selecting flow-lines determined from the focusing and correlating steps to link to the first flow line, thereby producing a matched image of the subsurface formations traversed by the borehole.

BRIEF DESCRIPTION OF THE FIGURES

These and other objects and features of the invention will be more readily understood from a consideration of the following detailed description, taken with the accompanying drawings, in which:

FIG. 6 shows a graph of the first derivative of the function expressed in the graph to its left in FIG. 6, and indicates by the dots the extremes of the graphs, which are the points of inflection;

DETAILED DESCRIPTION OF SPECIFIC EMBODIMENTS

Figure 1:
FIG. 1 is a reproduction of a two-dimensional resistivity image of a sector of a borehole wall, as obtained using the Formation Microscanner referred to above.

Referring now to the embodiment of the invention shown in the drawings, and without thereby limiting the scope of the invention, FIG. 1 shows by way of example a portion of a borehole image produced by one of the sensor arrays in an FMS tool; this image and the manner of producing are now well known in the art. In general, it is produced by moving a circumferentially-extending array of parameter sensors along a sector of a wall of a formation borehole wall. The gray scale of the image represents the magnitude of the borehole wall parameter sensed, which in the case of the FMS is resistivity; black represents low resistivity, while white represents high resistivity. The image has a longitudinal dimension y (extending vertically in FIG. 1) corresponding to the longitudinal direction of the bore hole, and a lateral dimension x (at right angles to y) corresponding to the circumferential direction in the segment of the borehole wall engaged by the pad carrying the sensor array. It is to be understood that the invention is not limited to the processing of image data representative of resistivity measurements, and instead is applicable to image data representing other parameters of the logged sector of the borehole wall.

The present invention relates to the processing and presentation of original image data from which images such as that of FIG. 1 are derived. While this original data can be expressed in many formats, in general the intensity I of the image is a function I(x,y) of the rectangular coordinates (x,y) of each point in the image, and is in the form of a digital number for each position x,y in the image, representing the resistivity at the point x,y.

The following description is divided, for convenience and clarity, into two sections, the first of which describes processing of the original image data derived from a single sensor array to produce flow-lines delineating the boundaries of beds in the logged earth formation; the second section describes a procedure for matching to each other several sets of image data obtained from circumferentially spaced-apart sectors of the borehole wall, and preferably thereby enabling automatic measurements of the dip planes of the boundaries of beds in the logged earth formation.

SINGLE IMAGE PROCESSING

The processing of a borehole image for delineating bed boundaries has two major parts: (1) the construction of a network of flow-lines, indicating bed directions, and (2) the selection of flow-lines corresponding to high resistivity contrasts, for identifying bed boundaries.

CONSTRUCTION OF FLOW-LINE NETWORKS

Figure 4:
FIG. 4 is a reproduction of an image showing a field of flow-lines corresponding to and derived from the field of tangent vectors of FIG. 3.

The first part of the processing produces, from the image data for FIG. 1, a set of lines called a field or network of flow-lines, as shown in FIG. 4. In the present embodiment it includes the following computer-programmed processing steps, exemplified for a preferred embodiment in FIG. 15.

Figure 15:
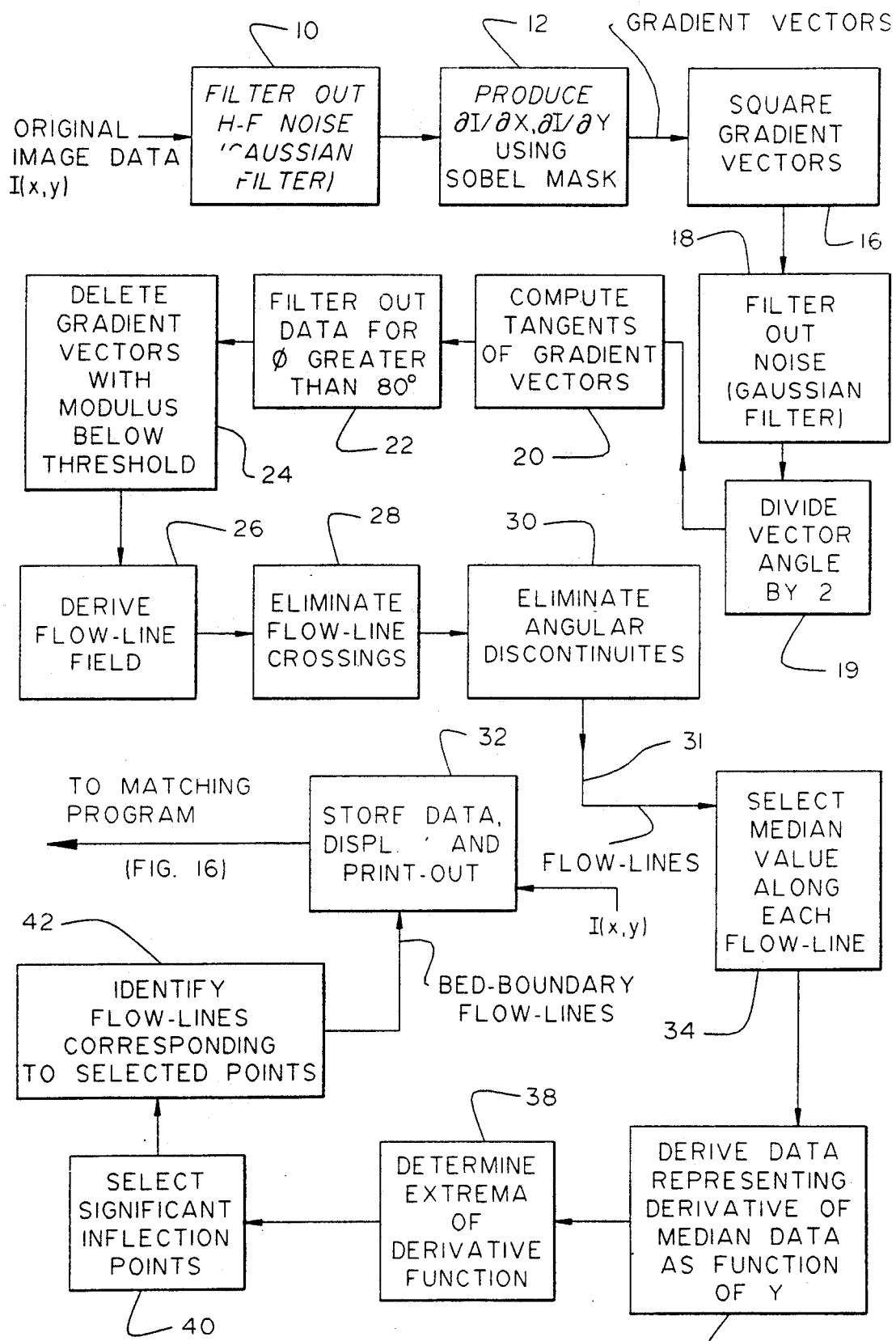
FIG. 15 is a flow diagram illustrating the preferred method for producing the bed-delineating bright lines.
Figure 16A:
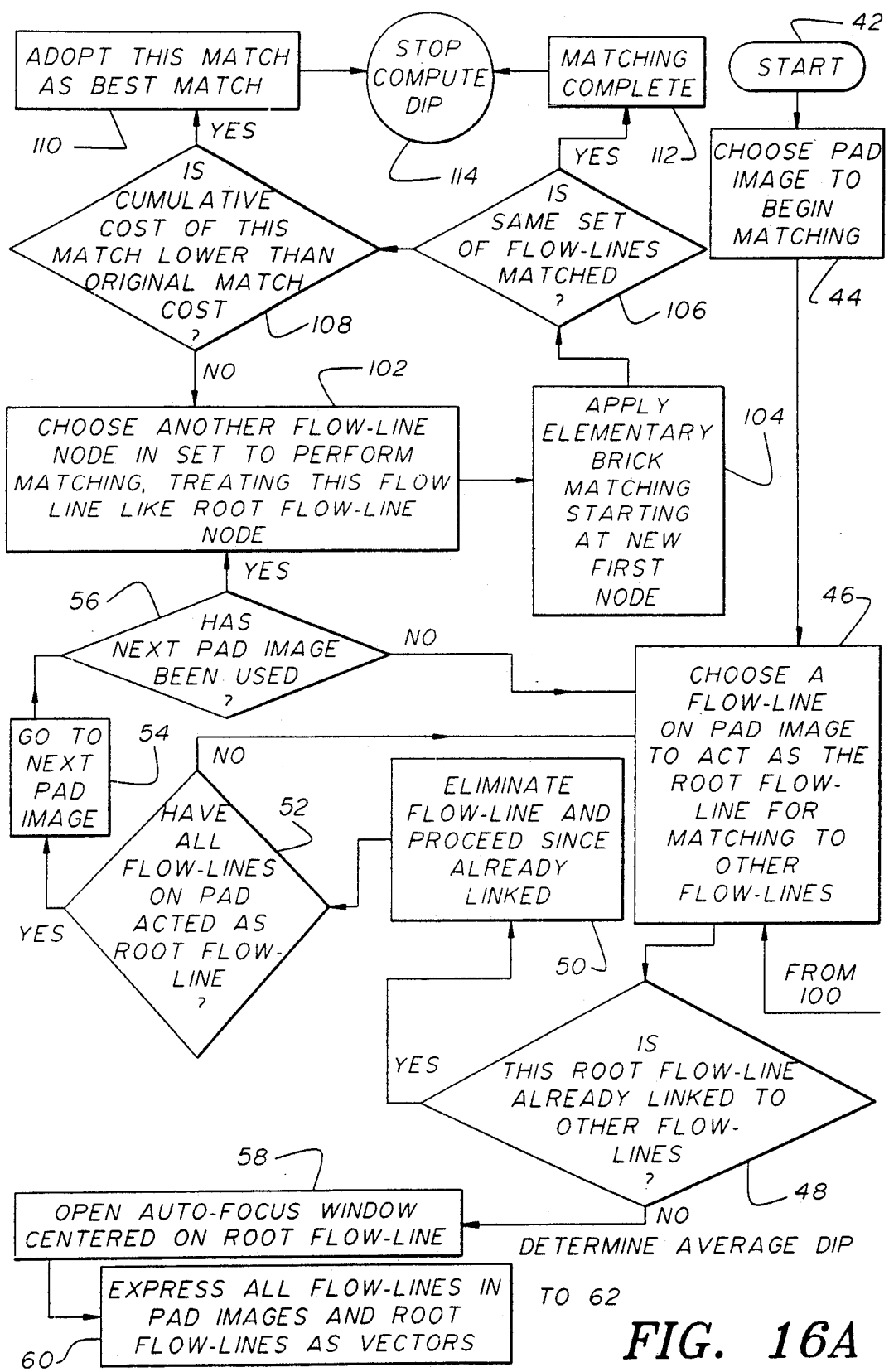
FIGS. 16a, b, c, d, and e are a flow diagram illustrating a preferred method for accomplishing matching of the sector images.
Figure 16B:
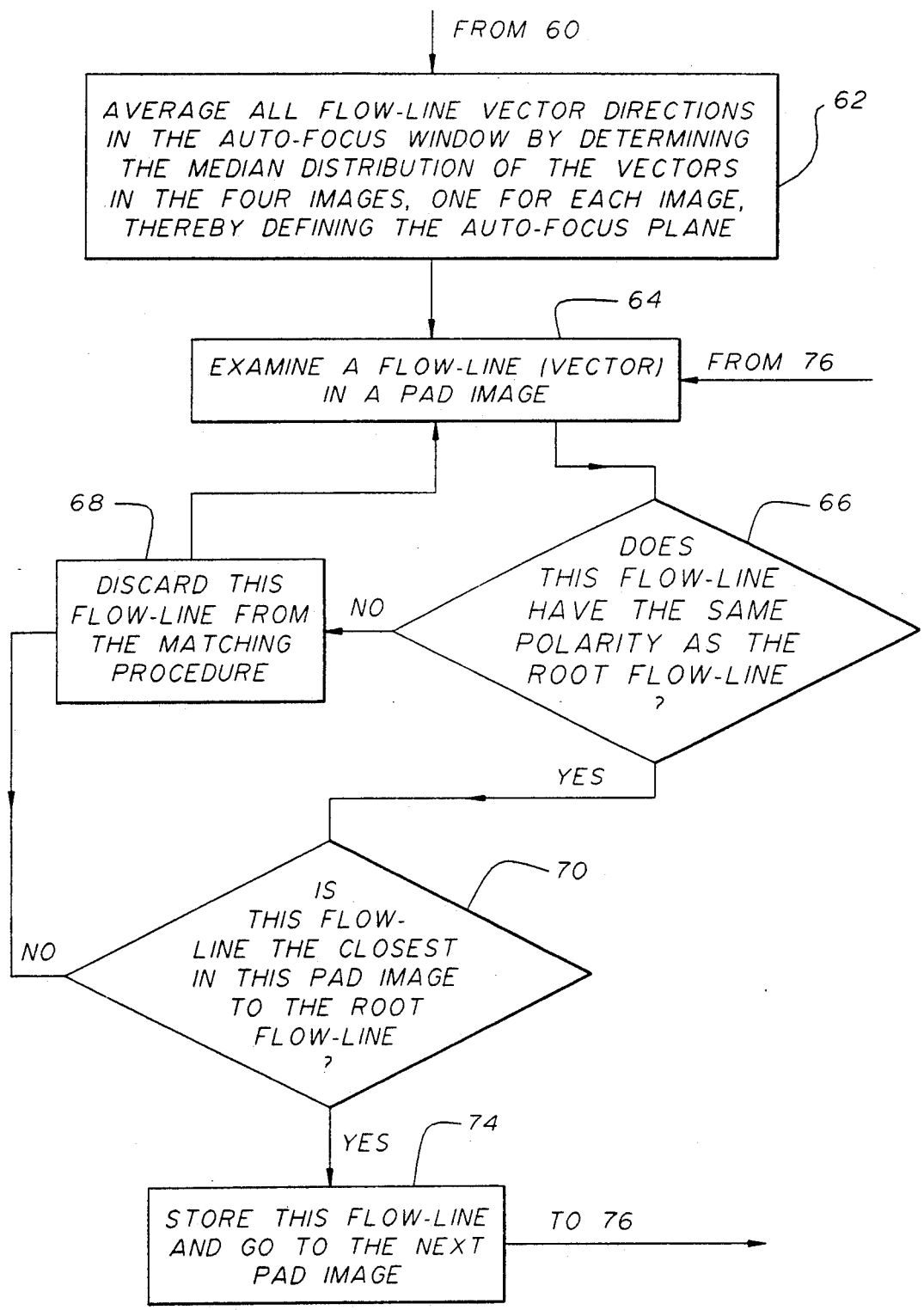
Figure 16C:
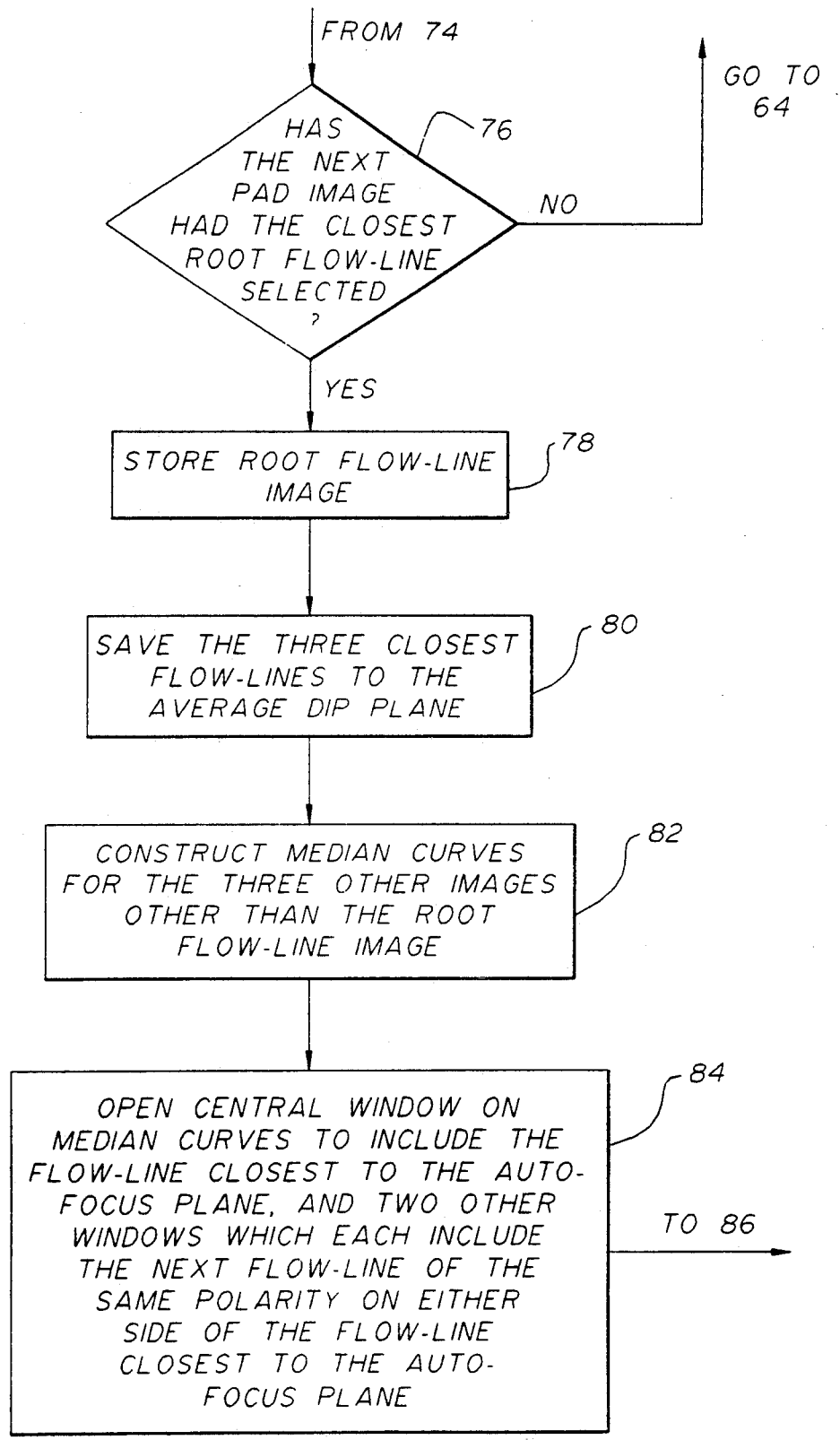
Figure 16D:
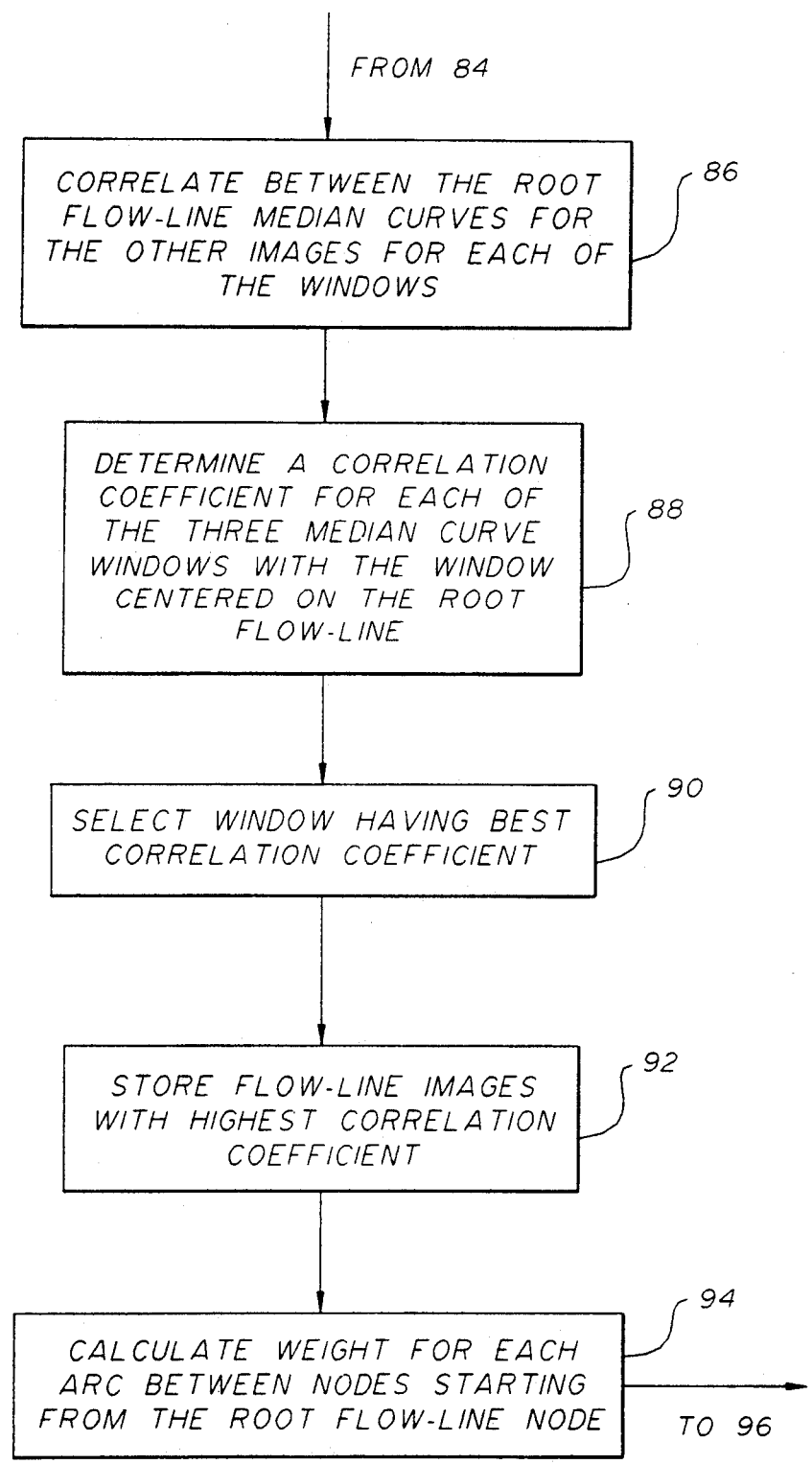
Figure 16E:
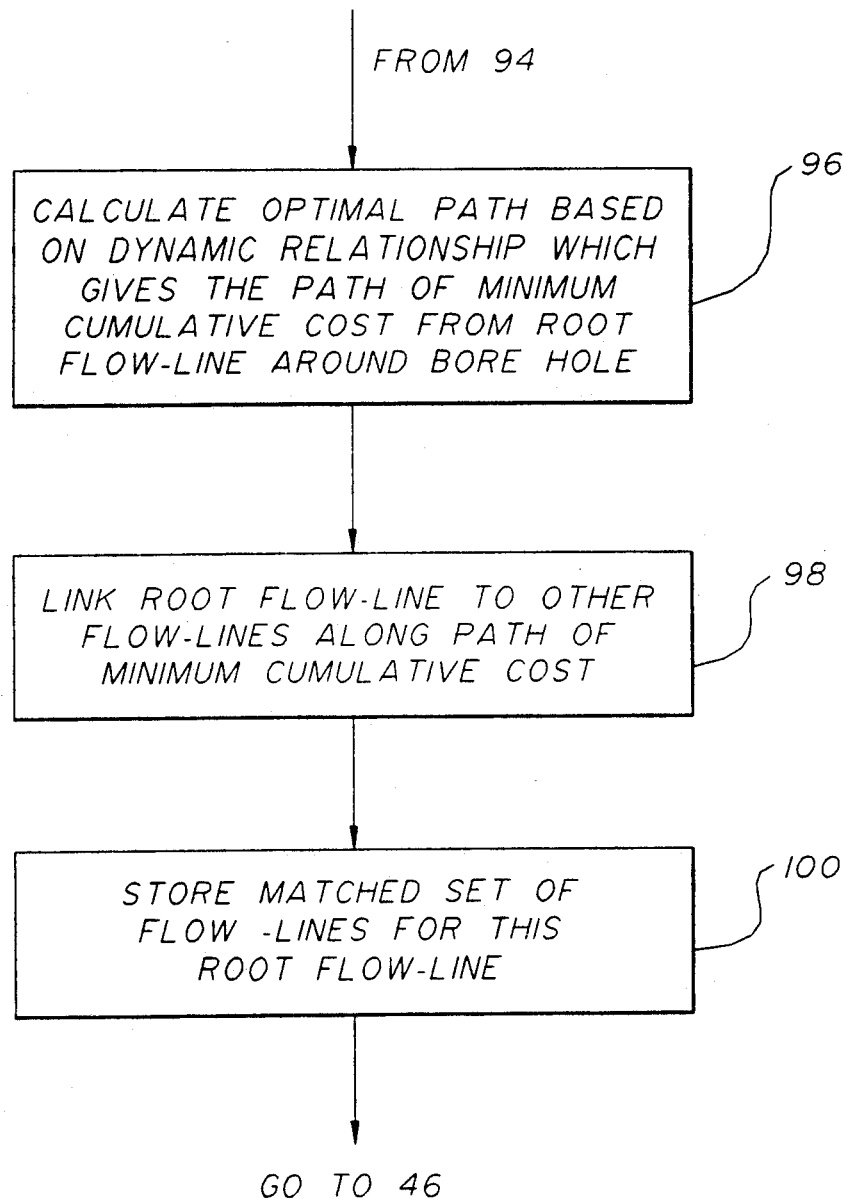

A preliminary filtering of the image data is performed, as shown at 10 in FIG. 15, to remove from the original image the high-frequency, uncorrelated noise. A suitable filter is a conventional, two-dimensional Gaussian filter having an impulse response as follows:

$$R(x,y) = \exp\frac{-(x^2 + y^2)}{2\sigma^2}$$

where sigma is the width of the filter response curve, and x and y are as defined above.

This filter has the advantage of being isotropic, i.e. invariant by rotation of the axes, and separable, as it can be expressed by a product of functions of x and y only, thus simplifying the implementation of the filter. A convenient approximation for this filter is provided by the Burt pyramid algorithm (Burt P. "The Pyramid as a Structure for Efficient Computation", Multiresolution Image Processing and Analysis, A. Rosenfeld (ed), Springer Verlag, New York (1984), 6–35.

The next step, shown at 12 of FIG. 15, is to derive from the image data thus filtered a field of gradient vectors. The image intensity, representative of the resistivity values, is a two-variable function I(x,y) with x and y as defined above, and the gradient is a vector having as its x,y components the partial derivatives $\partial I/\partial x$ and $\partial I/\partial y$. The property of the gradient vector is that it is oriented in the direction in which the image intensity shows the largest variation. Consequently, the direction orthogonal to the gradient will be the direction of minimum change, called the flow direction.

Figure 2:
FIG. 2 is a reproduction of an image, corresponding to that of FIG. 1, illustrating a field of gradient vectors obtained from the image data represented in FIG. 1.

FIG. 2 shows the field of gradient vectors generated from the image of FIG. 1. The computer computation of the gradient can be implemented in the case of discrete functions by applying conventional convolution masks, as depicted at 12 in FIG. 15. Sobel masks are preferably used for this purpose, defined by the following matrices:

| for $\partial I/\partial x$ | −1 | 0 | 1 |
|---|---|---|---|
| | −2 | 0 | 2 |
| | −1 | 0 | 1 |
| and for $\partial I/\partial x$ | 1 | 2 | 1 |
| | 0 | 0 | 0 |
| | −2 | −2 | −1 |

The azimuth of the gradient vector, orthogonal to the flow direction, is then easily computed from the vector components $\partial I/\partial x$ and $\partial I/\partial y$, as described below.

Before the latter step, the gradient field vectors are preferably first squared and then filtered, as shown at 16 of FIG. 15. The squaring consists of doubling the angle of the vector with respect to the x direction and squaring its modulus, and may be done by conventional computer programming. The effect is to give the same direction to initially opposite vectors, so that they will combine positively instead of cancelling each other during the subsequent filtering. Also, the squaring has the effect of enhancing high modulus vectors.

After squaring, conventional programmed Gaussian filtering is preferably applied, as shown at 18 of FIG. 15, to eliminate noise. The filtering is preferably carried out in the longitudinal direction only, and preferably by using the Burt pyramid referred to above. Next, as depicted at 19, the gradient vector angles are halved by a single conventional computer operation, to restore them to the values they had before doubling in step 16.

Tangents to the flow-lines are orthogonal to the filtered gradient vectors and are easily computed by conventional programmed computer techniques, as shown at 20 of FIG. 15. If Gx and Gy are the components of the squared gradient from 19, the angle $\phi$ between the flow-line direction and the x direction is such that:

$$\tan\phi = \frac{G_y}{G_x - (G_x^2 + G_y^2)^{\frac{1}{2}}}$$

and is readily computed.

Tangent angles near the vertical, which are likely to correspond with fractures in the earth formation, are then filtered out by a conventional computerized notch filter, as shown at 22 of FIG. 15. This filter simply removes data for all angles $\phi$ greater than a predetermined threshold angle, which can be set to 80°, for example. Tangents having angles greater than this are probably due to vertical fractures in the earth formation, whereas the invention seeks to determine layers more nearly at right-angles to the borehole axis.

Moreover, if the modulus of the vector gradient is too small, the tangent angle will not be reliable. Accordingly, by conventional programming tangent angle information is preferably not computed for vectors having a modulus smaller than a predetermined practical threshold, as shown at 24 of FIG. 15.

Figure 3:
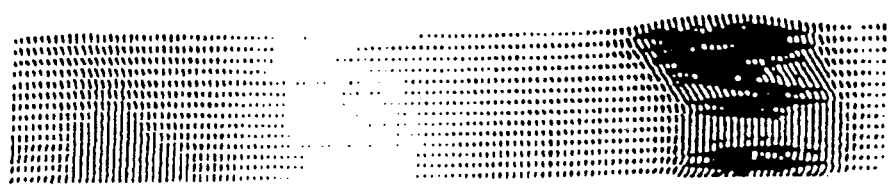
FIG. 3 is a reproduction of an image showing a field of tangent vectors corresponding to and derived from the gradient vectors of FIG. 2, after a filtering operation.

The tangent field thus obtained is illustrated in FIG. 3. As represented at 26 of FIG. 15, the tangent data make it possible to derive, by conventional programming, a set of curves called the flow field, or field of flow-lines, shown in FIG. 4 and having as their tangents at every point the tangent angles illustrated in FIG. 3. This may be done by programmed processing which involves the setting up and solution of a differential equation, or the following equation can be solved stepwise by starting from a root point ($x_o$, $y_o$) and making small steps of fixed length $\Delta x$ in the direction of the tangent to obtain successive values of y produced by the successive values of $\Delta x \tan\phi$:

$y = f(x + \Delta x) = f(x) + \Delta x \tan\phi$ wherein the length $\Delta x$ is the lateral sampling rate of the borehole image (the lateral distance between electrodes in an FMS tool). The root point is preferably chosen at the longitudinal median line of the image at successive depth levels.

Further processing steps are then preferably performed by computer programming to avoid effects of flow-line crossings and angular discontinuities, as shown at 28 and 30 of FIG. 15. Flow-line crossing may occur in the presence of two anisotropy directions on the image, for example if a fracture crosses a bed boundary. If a pair of crossing flow-lines is detected, a programmed choice is made to retain one of the flow-lines and reject the other. The test preferably consists of summing the image intensity variations along each flow-line; the flow-line having the smaller sum is then kept, the other rejected.

Angular discontinuities, called breaks, are preferably removed by a programming step, as shown at 30 of FIG. 15; this is preferably done by analyzing the rate of change of the flow-line direction and, if the difference between angle $\phi$ at one point and angle $\phi$ at the next point is greater than a predetermined value, discarding the flow-line.

FIG. 4 shows a display of the flow-lines from step 30, as present on line 31 of FIG. 15.

SELECTING BED BOUNDARIES

Figure 5:
FIG. 5 is a reproduction of an image obtained by the superposition of the field of flow-lines of FIG. 4 on the initial borehole image of FIG. 1.

The next part of the processing is aimed at identifying bed boundaries within the field of flow-lines shown in FIG. 4. The selection is based on an analysis of resistivity contrasts; a bed boundary will be identified by a high resistivity contrast. FIG. 5 shows the superposition of the geometrical flow field of FIG. 4 upon the image of FIG. 1 showing resistivity values.

To select the desired boundary lines, or "bright lines", a value characteristic of the set of resistivity values corresponding to the points of a given flow-line is first determined for each set. This value is best chosen as the median; that is, the set of resistivity values along each flow-line is sorted and the median value of the set is determined, by conventional programming, as shown at 34 of FIG. 15. All the characteristic values obtained for the flow-lines of the field are then scanned to select data corresponding to a curve such as the left-hand curve of FIG. 6 in which, for each flow-line, a point is plotted having the middle point of the flow-line as the coordinate in the horizontal direction.

Figure 6:
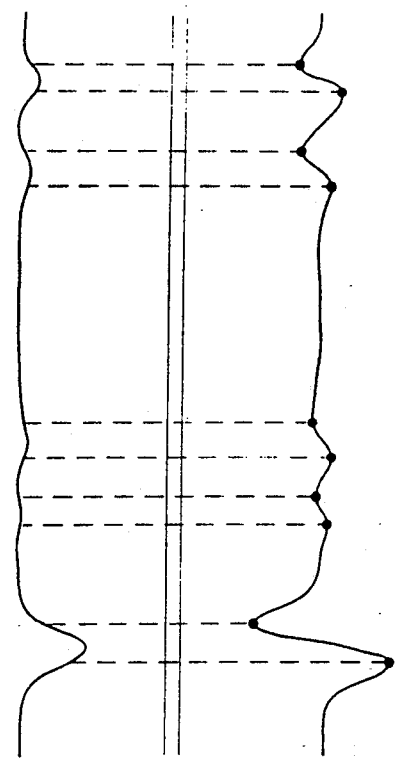
FIG. 6 shows at the left of its two center lines a graph joining the median values of each flow-line in FIG. 5, along a vertical axis extending longitudinally of the borehole; at its right.

In the median curve of FIG. 6, the computer program searches for and determines inflection points in the curve. This is done, in effect, by constructing the derivative curve depicted on the right in FIG. 6, as shown at 36 of FIG. 15, and finding the extrema of this derivative curve as shown at 38 of FIG. 14. The taking of the derivative can be combined with Gaussian filtering by convolving the median curve with the derivative of a Gaussian function, to dampen effects of noise produced in obtaining the derivative.

Figure 7:
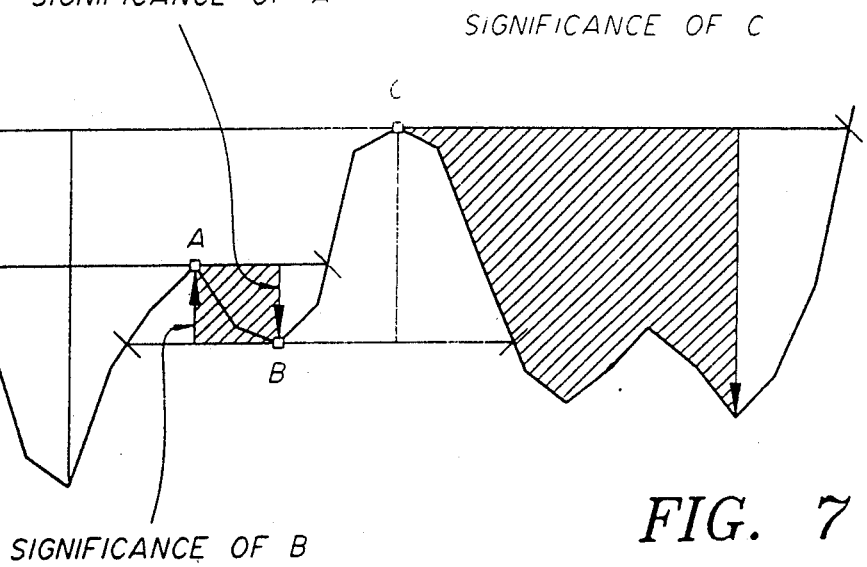
FIG. 7 is a graphical representation which will be referred to in describing the "significance" criterion as applied to selecting the bed boundary lines from the flow-lines of FIG. 4.

Rather than using all inflection points, a selection is then preferably made to identify the significant inflection points of the median curve, as shown at 40 of FIG. 15. The selection preferably makes use of the the "significance" concept described in Vincent Ph., Gartner J.E. and Attali G: "GEODIP, An Approach to Detailed Dip Determination Using Correlation by Pattern Recognition", paper SPE 6823 presented at the 1977 SPE Annual Technical Conference and Exhibition, Denver, Oct. 9–12, 1977, and incorporated herein by reference; the essence of the procedure for the present case is represented in FIG. 7. For a given maximum of the curve, e.g. point C, the "significance" is the depth of the less deep of the two deepest troughs located on each side. For a minimum such as B, the "significance" is the height of the less high of the highest two peaks located on each side. Only those inflection points having a "significance" greater than a predetermined threshold are retained by the computer program. The flow-lines containing these significant inflection points are computer-selected to represent bed boundaries as shown at 42 of FIG. 15, and are preferably stored for display as shown at 32 of FIG. 15.

Figure 8:
FIG. 8 is a representation like that of FIG. 1, but on which are superimposed the computer-generated, selected bright lines delineating the bed boundaries of an earth formation.

FIG. 8 illustrates the output of this processing, showing the selected "bright" flow-lines indicating bed boundaries, superimposed on the borehole image of FIG. 1. The bright bed-boundary lines are not only useful when viewed by a borehole analyst, but are also useful in the matching process next to be described.

MATCHING SEVERAL SINGLE-IMAGE OUTPUTS

In the case of a borehole image providing a full coverage of the borehole wall, i.e., covering a 360° angle, there is no need for matching several outputs from single images. The only constraint to be met would be the closure of both ends of a bed boundary.

The currently available borehole imaging tool, namely, the Formation Microscanner (FMS) of Schlumberger, has two or four imaging pads, with each pad engaging an angular sector of the borehole wall of, for example, 30° to 40°. This yields several images corresponding to angularly spaced segments of the borehole wall, from which respective sets of flow-lines, indicating boundary beds can be obtained by the processing described above. Since it is the same bed boundary which is shown by these sets of flow-lines for each sector, a matching process is provided, as described below, and as shown in FIGS. 16A–16E, which links the selected flow-lines of different images which pertain to the same bed boundary.

Figure 10:
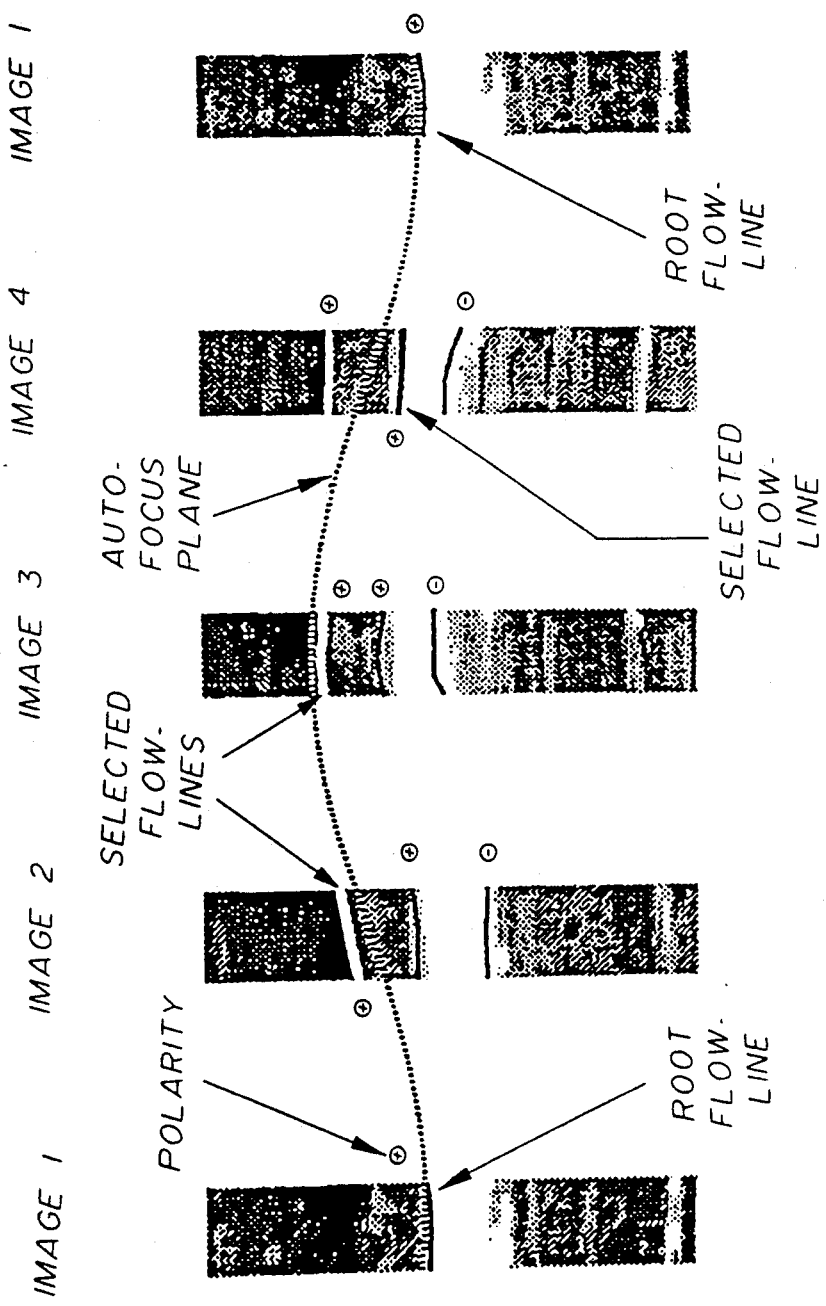
FIG. 10 show a set of four such borehole images and indicia, to which reference will be made in explaining the matching of sector images.

The following description relates to the case where four images are available, as shown in FIG. 10. These images are numbered as images 1, 2, 3, 4 in FIG. 10. The matching process starts from a given flow-line in one of the images, called the root flow-line, located in image 1. A first step is to search in the other images (images 2 through 4) for the flow-lines which are likely to show the same boundary as the root flow-line.

Figure 9:
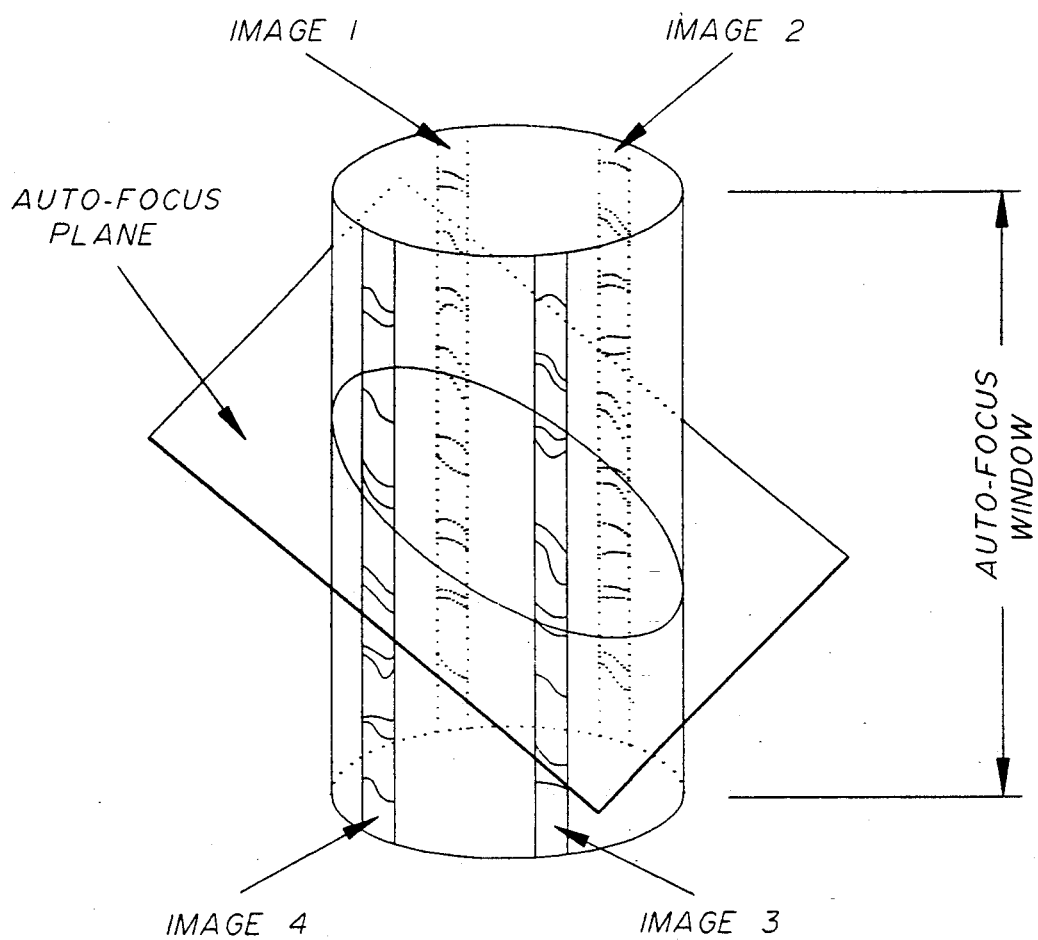
FIG. 9 is a schematic representation to which reference will be made in defining and describing the "auto focus" plane used in matching flow-lines of two or more borehole images obtained from different circumferentially spaced-apart sectors of a borehole wall.

This is implemented, in the present embodiment, by determining the average direction of flow-lines at the level of the root flow-line, and selecting in images 2 through 4 the flow-lines closest to this average direction. The average direction is defined by a dipping plane called the "auto-focus plane" shown in FIG. 9. In an auto-focus window centered at the root flow-line, all flow-lines from all four images are expressed as vectors. Vectors of images 1 and 3 are analyzed to determine the median vector of their distribution. Likewise, the median vector for the distribution of vectors in images 2 and 4 is determined. The median vectors from the four images preferably define together the auto-focus plane shown in FIG. 9. This process is performed for each flow-line the flow-line in question being in each case at the center of the auto-focus window.

Then, for each root flow-line, the flow-line of each of the other images which is closest to the respective auto-focus plane and has the same polarity as the root flow-line (that is, across which the resistivity varies in the same direction as across the root flow-line) is selected, thus yielding a set of three flow-lines. In preferred embodiments, FIG. 10 illustrates this selection around the auto-focus plane, represented by a sinusoidal curve.

Figure 11:
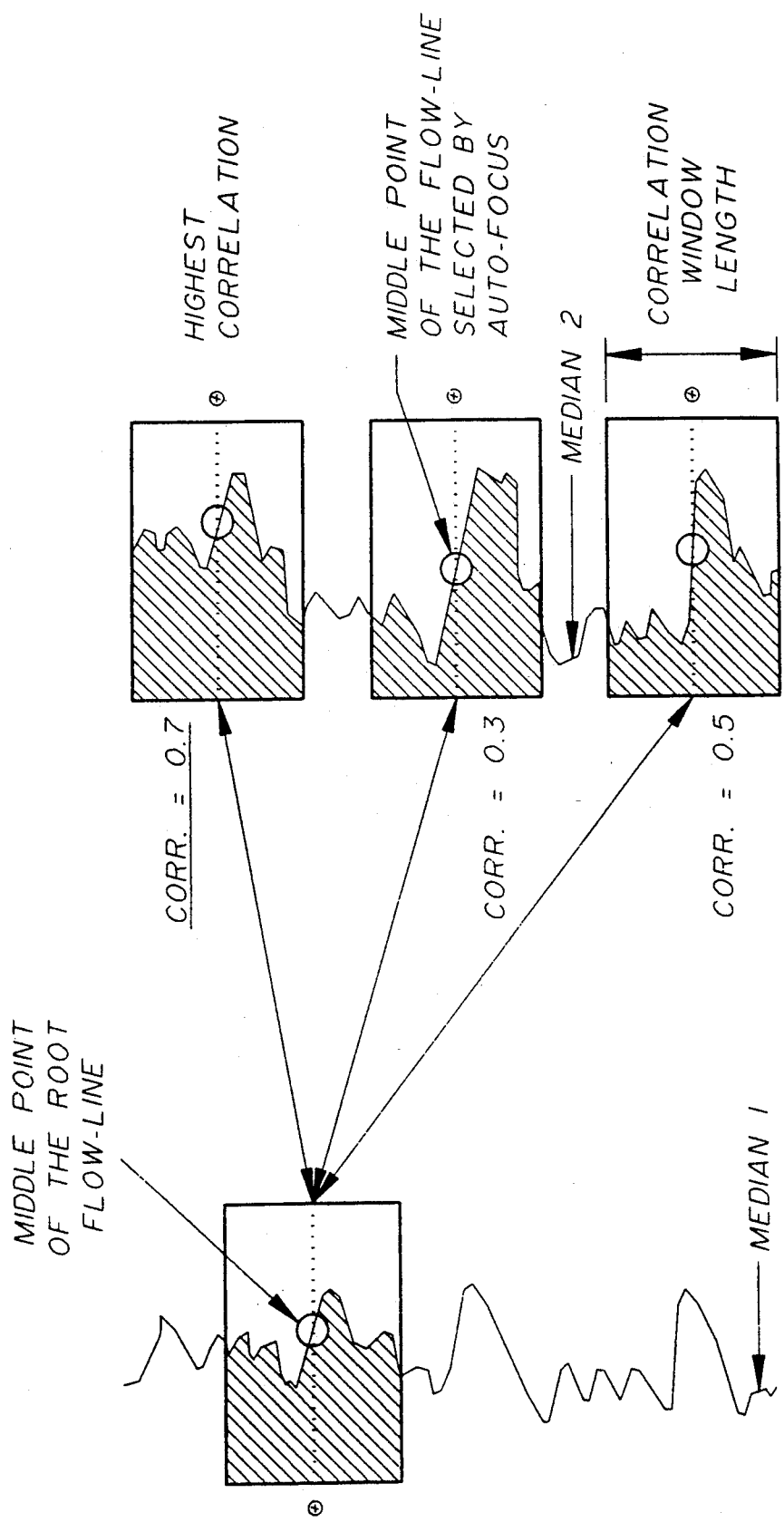
FIG. 11 is a schematic representation to which reference will be made in discussing a correlation criterion used in such matching.

After auto-focusing has allowed selection of flow-lines on each image closest to the average dip plane, it is preferred to find the flow-lines in each image for which there is a good correlation to the pattern of resistivity variations. To accomplish correlation in preferred embodiments, the median curves constructed as part of the first section of the processing are used, as shown in FIG. 11. The left-hand part of FIG. 11 is the median curve of the image comprising the root flow-line and the right-hand part is an exemplary median curve of another image from one of the pads. Three windows are preferably opened for the correlation search. The central window includes the flow-line closest to the auto-focus plane. The other two windows include the next flow-lines of the same polarity on both sides of the flow-line closest to the auto-focus plane. For each of the windows, the correlation between the median curve portion and the median curve in the vicinity of the root flow-line is determined. For example, correlation coefficients of 0.7, 0.3 and 0.5 are found, as shown in FIG. 11.

In preferred embodiments, the flow-line located in the window showing the strongest correlation with the window centered on the root flow-line is selected; here the upper window in the example of FIG. 11.

Figure 12:
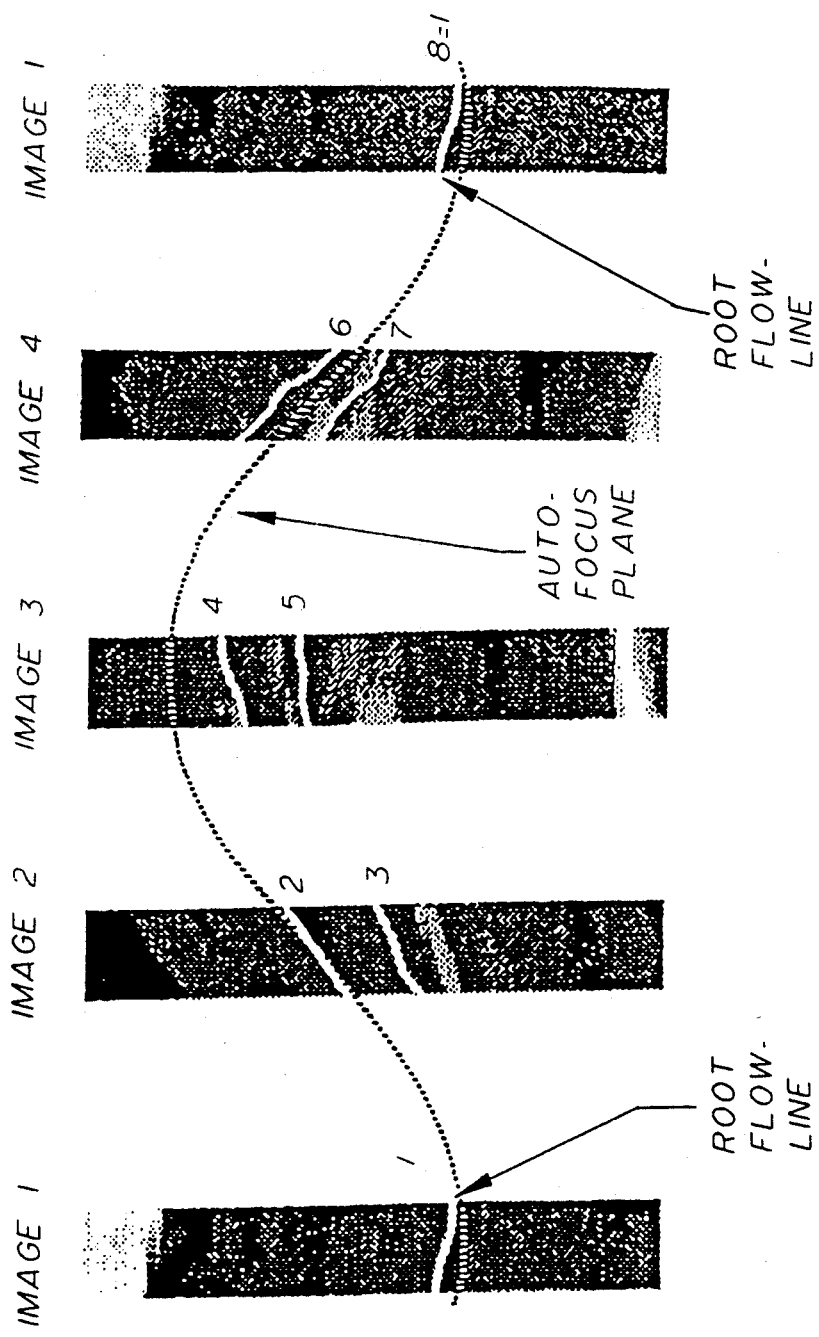
FIG. 12 is a representation of sector images with reference to which a step in the matching process will be described.

In an optimal situation, correlation of the flow-lines to the root flow-line gives the same set of flow-lines for matching as auto-focusing. But the results may be different, as exemplified in FIG. 12. The root flow-line being in image 1, auto-focusing and correlation lead to two different flow-lines in each of the other images; flow-lines 2 and 3 in image 2; flow-lines 4 and 5 in image 3; and flow-lines 6 and 7 in image 4.

Figure 13:
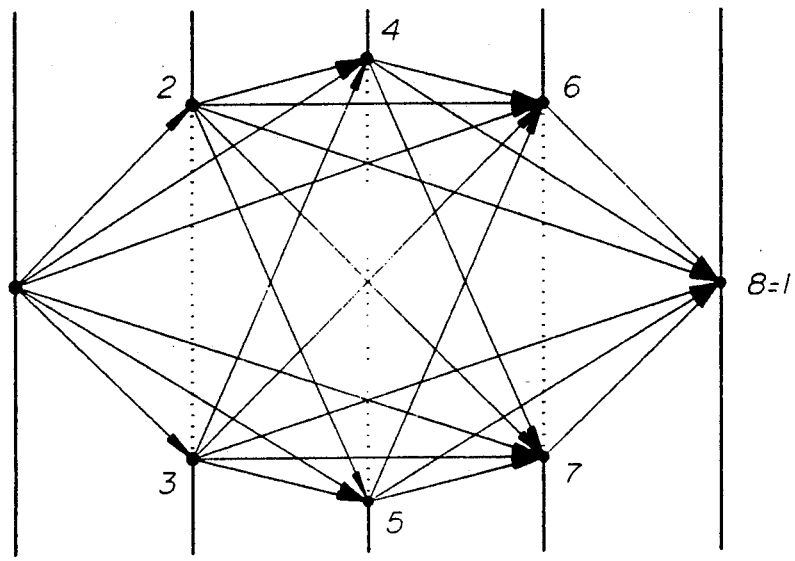
FIG. 13 is a schematic representation to which reference will be made in describing various selection operations taking place in the matching process.

A suitable method to complete the selection will be understood from the graph illustrated in FIG. 13. Each possible choice for a flow-line is a vertex, the root flow-line being vertex 1 or 8. Every possible combination of flow-lines corresponds to a path. A "cost" is defined for each edge (or sub-path), and in preferred embodiments the path having the minimum cumulative cost can be considered the optimum path for matching the flow-lines.

Figure 14:
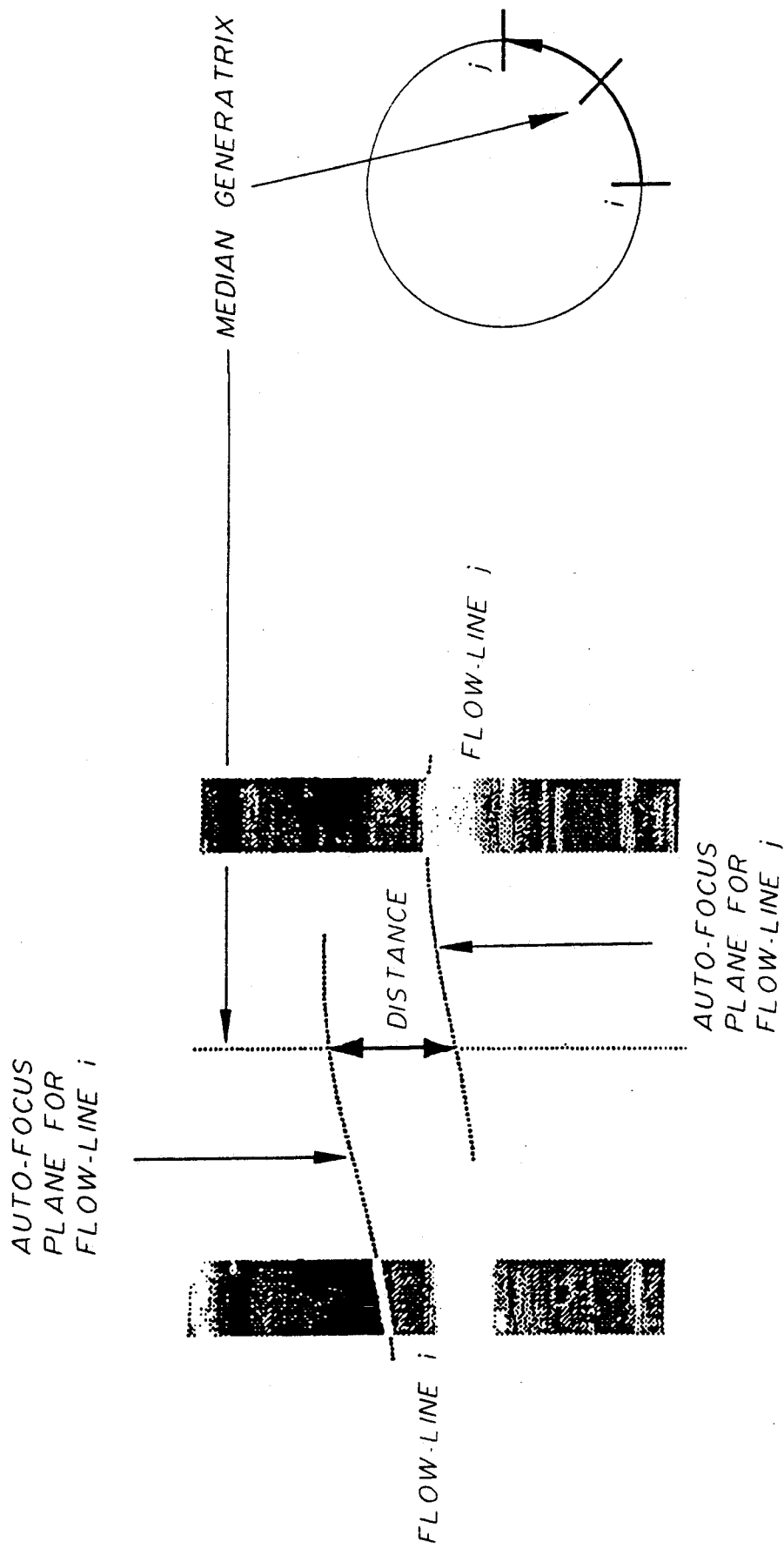
FIG. 14 is a schematic representation to which reference will be made in discussing the matching operation.

In still further preferred embodiments, the cost function may be determined as a combination of weighted criteria, and more preferably is a multiplicative combination of three criteria: (a) planarity, (b) contrast similarity, and (c) correlation. Planarity is expressed by the distance between the auto-focus planes pertaining to respective flow-lines as illustrated in FIG. 14. Contrast similarity is provided by a ratio of the significance values as described in the first section of this detailed description and as illustrated in FIG. 7. The correlation value is the coefficient described above with reference to FIG. 11.

Finally, a dynamic programming process may then be preferably used to determine the path of minimum cumulative cost. In preferred embodiments, the set of connected flow-lines thus selected has been determined with "1" acting as the root flow-line. The next processing step is preferably to verify that the same set of flow-lines will be selected if each other flow-line of the set is taken as the root flow-line. If the result is different, then a choice must be made between two or more sets. In still further preferred embodiments, this can be done by selecting the set having the lowest cumulative cost.

DIP COMPUTATION

From the set of connected flow-lines selected by the above-described processing, a "best fit" plane can be determined in preferred embodiments. This plane is such that the mean square of orthogonal distances of the connected flow-lines to this plane is minimized. The dip (herein defined as the angle with respect to vertical and azimuth) of this plane is then computed. Inclinometry information defining the orientation of the borehole (angle with respect to vertical, azimuth) having also been acquired at the same time as the borehole images in the usual scheme of logging is used in the computation of dips as is conventional in the art.

Matching provided in accordance with the present invention allows efficient and accurate delineations of bed boundaries in subsurface formations. Referring to FIGS. 16A–16E, a flow diagram of a preferred embodiment of matching provided in accordance with the present invention starts at 42. At step 44 one of the four pad images on, for example, an FMS is chosen at 44 wherein bright flow-lines have been determined. At step 46 a flow-line on the pad is chosen to act as the "root flow-line" for matching to other flow-lines in the other images.

If this flow-line, now called the "root flow-line," has already been linked to other flow-lines in the four pad images at step 48, then at step 50 this root flow-line is eliminated. It is then determined at step 52 whether all the flow-lines on this pad have already acted as root flow-lines. If not all the other flow-lines have acted as root flow-lines, then the procedure goes back to step 46 otherwise at step 54 one of the next four pad images is used and it is then determined at step 56 whether all pad images have had flow-lines functioning as root flow-lines to be linked. However, if at step 48 the root flow-line has not been linked to other flow-lines in the four pad images, then matching can occur.

Matching thus proceeds in preferred embodiments at step 58 wherein an auto-focus window centered on the root flow-line is opened. It is desirable at step 60 to then express all the flow-lines and the root flow-lines as vectors. It will be recognized by those with skill in the art that vector representations of the flow-lines according to, for example, Cartesian, spherical, or cylindrical coordinates can be easily achieved so that matching can proceed. After the vector representations of all the flow-lines and the root flow-line are constructed, it is generally desirable to average all the flow-line vectors in the window to determine the median distribution of the vectors in the four images, one for each image, thereby defining an auto-focus plane at step 62. Matching can then further proceed wherein a flow-line in another pad image is examined at step 64. At step 66, it is determined if the flow-line so examined has the same polarity as the root flow-line. If it does not, then this flow-line must be discarded at step 68 and another flow-line is chosen for examination.

However if the flow-line has the same polarity, it is determined at step 70 whether this flow-line is the closest flow-line in this pad image to the root flow-line. If this is not the case, then at step 72 this particular flow-line is discarded and another flow-line in this pad image is examined, that is, the method goes back to step 68. However, if this flow-line is the closest flow-line in the pad image to the root flow-line, then at step 74 this flow-line is stored and it is desired to examine the next pad image to determine the closest flow-line in the new pad image which can be linked to the root flow-line.

At step 76, it is then determined whether the next pad image has already had the closest flow-line to the root flow-line selected. If this pad has not had the closest flow-line selected, then the procedure goes back to step 64 wherein the closest flow-line to the root flow-line in this pad image will be determined. However, if the next pad image already has had the closest flow-line to the root flow-line selected, then the average auto-focus dipping set of flow-lines have been determined, and at step 78 this root flow-line image is stored.

At step 80, the three closest flow-lines in the other three pads to the average dip plane are stored and a correlation procedure is undertaken to prune all the possible candidates to match to the root flow-line since, in the case of a rapid dip change in a particular bed formation, simple averaging of the flow-lines to determine a match is generally not sufficient. Correlation begins at step 82, wherein median curves for the three other images other than the root flow-line image are also constructed. To begin correlation, at step 84 a central window on the median curves is opened in preferred embodiments to include the flow-line closest to the auto-focus plane, and two other windows are also opened which each include the next flow-line of the same polarity on either side of the flow-line closest to the auto-focus plane.

Standard correlation is then preferably applied at step 86 between the root flow-line median curve and the median curves for the other images for each of the windows which have been opened. It is generally desired to then determine a correlation coefficient for each of the three median curve windows with the windows centered on the root flow-line such that at step 90 the window having the best correlation coefficient is selected. Correlation as understood by those with skill in the art can be accomplished, for example, by the correlation methods disclosed in U.S. Pat. Nos. 4,251,773, Calliau et al., and U.S. Pat. No. 4,316,250, Vincent, the teachings of which are specifically incorporated herein by reference. It is then desired at step 92 to store the flow-line images having the highest correlation coefficients, and then the correlation procedure is completed. The actual elementary brick matching procedure can then begin.

Figures 17, 18:
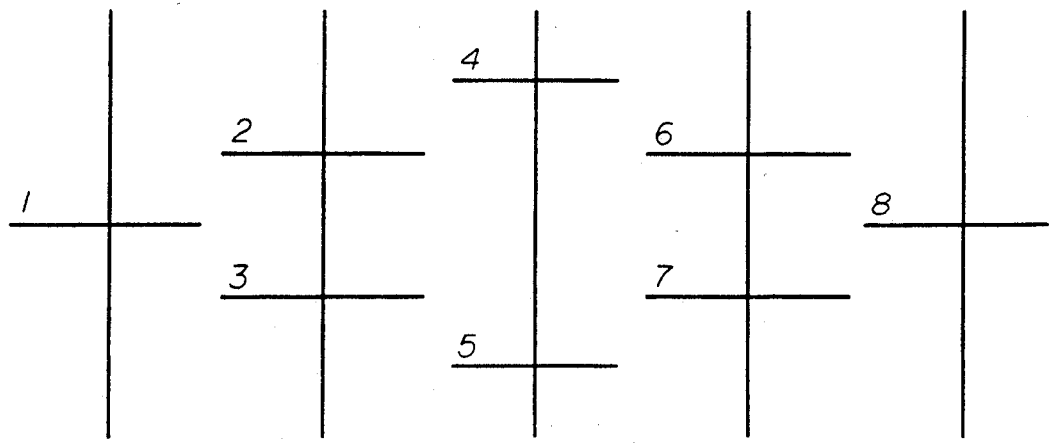
FIG. 17 illustrates selected flow-lines and the root flow-lines after auto-focusing and correlation have occurred.
FIG. 18 illustrates the set of possible linking arcs of the root flow-line to all other flow-lines in FIG. 17 before a dynamic process determines the path of minimum cumulative cost.

Referring to FIG. 17, preferred four pad FMS images now have bright flow-lines chosen from the correlation and auto-focusing routines such that there is a root flow-line on a given image and on each other image other than the root flow-line image, there is a flow-line closest to the average dip plane and a flow-line with the highest correlation coefficient. On FIG. 17, flow-line 1 in image 1 is the root flow-line, flow-lines 2, 4 and 6 on images 2, 3 and 4 respectively are the flow-lines closest to the average dip plane, and flow-lines 3, 5 and 7 are the flow-lines having the highest correlation coefficient. It should be understood that the root flow-line may not always be on image 1, and flow-lines 2, 4 and 6 are not always necessarily above flow-lines 3, 5 and 7, but in this example it is convenient to illustrate the flow-lines in this fashion. Additionally in certain situations, flow-lines 3, 5 and 7 may not exist at all if the highest correlation coefficient is too low. Flow-line 8 essentially corresponds to flow-line 1 and is the wraparound flow-line from pad image 1 of the bore.

In further preferred embodiments, the matching routine attempts to match flow-line 1 to flow-line 2 or 3 or nothing at all, to flow-line 4 or 5 or nothing at all, and to flow-line 6 or 7 or nothing at all. By examining FIG. 17 it becomes apparent that there is an underlying graph having nodes corresponding to the flow lines 1, 2, 3, 4, 5, 6, 7, 8 (−1).

Referring now to FIG. 18, possible linking arcs are denoted by the pairs of flow-lines in the combinations so illustrated. A match for the root flow-line (flow-line 1) is a path in this graph linking node 1 to node 8, that is node 1 around the borehole. By linking the arcs of FIG. 18 across the flow-lines of FIG. 17, all the possible arcing combinations are shown as described in FIG. 13. In order to accomplish such matching in preferred embodiments, each arc is assigned a weight and the path having the lowest weight is preferably adopted. Weights are assigned according to the following emperical equation:

$$\text{Weight}(i,j) = (\text{gap}(i,j) * (d(i,j) + P1 * (P1/P2)) * P2;$$

where gap (i,j) is the number of inter-image spaces which are skipped when going from node i to node j. In the above example, gap(1, 2)=1, gap(1,4)=2, gap(1,6)=3, gap(5,8)=2, etc. d(i,j) is associated with a distance between node i and node j. The distance d(i,j) is computed using the traces of the "average" dip planes passing through nodes i and j. On an unwrapped image, the two planes are drawn as sine waves. If the hole generatrix equally distant from the central generatrix of an image bearing node i and from the equivalent generatrix for node j is plotted, two sine waves are intersected at two points. The ratio of the distance between these two points and the average hole radius is defined as d(i,j). P1 and P2 are emperical tuning parameters wherein P1 sets a minimum value for the weight in the case where d(i,j) is null. This preferably puts an extra penalty on the weight for the two nodes whose images are far apart, that is having a big gap. The higher P1 is, the higher the penalty on the weight of the two flow-lines being far apart. In preferred embodiments, a good value for P1 is approximately 0.3. P2 is designed to put an extra penalty on larger weights. Thus the weight is not a linear function of the distance, d(i,j). In further preferred embodiments, a good value for P2 is approximately 2.0.

Referring again to FIGS. 16A–16E, matching at step 94 is then begun by calculating the weight for each arc between flow-line nodes starting from the root flow-line node. It is then preferably desired to calculate the optimal path to connect the flow-lines based on a dynamic relationship which gives a path of minimum cumulative cost from the root flow-line around the bore imaged by the FMS. A dynamic programming algorithm wherein cost values are stored is preferably executed and it will be well recognized by those skilled in the art that dynamic programs for minimizing such cost functions are routine.

At step 98 it is then desired to link the root flow-line to the other flow-lines along the path of minimum cumulative cost as determined by the dynamic program. At step 100 the matched set of flow-lines for this root flow-line having a minimum cumulative cost is then stored, and the method returns to step 46 so that other flow-lines can act as root flow-lines to perform matching. Once all pad images have been used and all flow-lines have been selected to act as root flow-lines at step 56, it is desired to verify whether indeed the flow-lines so matched are the correct or "best" matches.

Verification starts at step 102, wherein another flow-line node in the set is selected arbitrarily to perform matching, treating this flow-line similarly to the root flow-line during the matching process as described at step 94. At step 104, the matching procedure is performed and it is determined at step 106 whether the same set of flow-lines are obtained to match the bed boundaries. At step 108, if the same set of flow-lines have not been obtained, then it is determined whether the cumulative cost of this new match is lower than the original flow-line cumulative cost. If this is a true statement, then at step 110 this match is adopted as the best match and at step 112 matching is completed. However, if this is not true, then verification begins with yet another arbitrary flow-line at step 102 and the verification matching proceeds again.

However, if at step 106 the same set of flow-lines have been obtained, then the original flow-line match was the best match and verification need proceed no further. Otherwise, it is generally desired to adopt the flow-line set having a match of least cumulative cost when different flow-lines act as the starting node for the verification procedure. The matching procedure then stops at step 114, and the dip angles can then be computed.

The matching and verification procedure disclosed herein can be implemented on a digital computer that is programmed with the appropriate software to perform the procedure so described. With methods provided in accordance with the present invention, efficient and accurate flow-line bed boundary matching is accomplished, thereby providing highly desired bed boundary delineations of subsurface formations traversed by a bore hole. Such results have heretofore not been achieved in the well-boring art.

While in the interest of complete definiteness the invention as been described with particular reference to specific embodiments shown and described in the specification and drawings, it will be understood that it may be embodied in a variety of forms diverse from those specifically shown and described, without departing from the spirit and scope of the invention.

We claim:

1. A method of delineating boundaries of beds in an earth formation traversed by a borehole, comprising the steps of:
   (a) producing from original image data containing information about a physical parameter of the earth formation a data field of flow-lines corresponding to directions of least change of the parameter in the image wherein the original image data is representative of variations of the physical parameter of the formation along the longitudinal direction of the boreholes and along a circumferential segment of the borehole wall, which respectively correspond to the longitudinal and the lateral dimensions of said image; and
   (b) selecting from the flow-line data field thus produced data corresponding to a subset of said flow-lines which delineate bed boundaries wherein said subset of flow-lines contains data corresponding to dip of the beds.

2. The method of claim 1, wherein the selecting step comprises the steps of deriving, from data as to each flow-line of said field, a characteristic value of said parameter for the corresponding respective flow-line thereby creating a set of characteristic values, and selecting, from within the set of characteristic values thus derived, those values corresponding to bed boundaries.

3. The method of claim 2, wherein said characteristic value is the median value of said parameter in the data for each flow-line.

4. The method of claim 2 or claim 3, wherein said values corresponding to bed boundaries are identified by determining inflection points in a curve consisting of the characteristic values for the flow-lines of said field.

5. The method of claim 4, comprising the steps of determining for each inflection point a significance value, comparing this significance value to a predetermined threshold, and selecting only the inflection points having a significance value above said threshold to identify bed boundaries.

6. The method of claim 1, wherein the step of producing a data field of flow-lines comprises the steps of producing from said original image data, consisting of a two-dimensional function $I(x,y)$ where w and y are coordinates of each image point respectively in the longitudinal and the lateral dimensions, data respresenting a field of gradient vectors; deriving, from said gradient-vector representing data, data representing a set of tangent vectors which are orthogonal to the gradient vectors; and deriving from said set of tangent-vector data a set of data representing a field of flow-lines having as their tangent at every point said tangent values.

7. The method of claim 6, wherein said field of gradient vectors is produced by applying a convolution mask to the original image data.

8. The method of claim 6 or claim 7 comprising, prior to deriving the tangent vectors, the step of filtering the field of gradient vector data by squaring the gradient vectors and Gaussian filtering the squared gradient vectors.

9. A method of delineating bed boundaries of earth formations traversed by a borehole, comprising the steps of:
   (a) producing data representative of a field of flow-lines in an image corresponding to minimal anisotropy directions of the flow-lines in the image, said data being derived from first image data which are representative of variations of a physical parameter of the earth formations along the longitudinal direction of the borehole and along a first circumferential segment of the borehole wall, which respectively correspond to the longitudinal and the lateral dimensions of the image,
   (b) selecting from the data field thus produced a first subset of flow-line data corresponding to bed boundaries wherein said subset of flow-line data contains information concerning dip of the beds,
   (c) repeating steps (a) and (b) with at least one further set of image data corresponding to a further circumferential segment of the borehole wall angularly spaced apart from the first segment, whereby data from a further subset of flow-lines corresponding to bed boundaries is selected, and
   (d) combining the subsets of flow-lines obtained as a result of steps (b) and (c) so as to match the flow-lines of respective subsets which correspond to the same bed boundaries, thereby generating set of connected flow-lines with each set defining a bed boundary.

10. The method of claim 9, further comprising the step of producing a geometrical description of bed boundaries from said sets of connected flow-lines obtained as a result of step (d).

11. The method of claim 10, wherein the selecting step comprises the steps of deriving, for each flow-line of said field, a characteristic value from the data forming the respective flow-line, and identifying, within the characteristic values thus derived, values corresponding to the bed boundaries.

12. The method of claim 11, wherein said characteristic value is defined as the median of the data for each flow-line.

13. The method of claim 12, wherein the values corresponding to bed boundaries are identified by forming a curve consisting of the characteristic values obtained for the flow-lines of said field, and determining inflection points in said curve.

14. The method of claim 13, further comprising the steps of determining for each inflection point a significance value, comparing this significance value to a predetermined threshold, and selecting only the inflection points having a significance value above said threshold to identify bed boundaries.

15. The method of claim 10, wherein the step of producing a field of flow-lines comprises the steps of producing from said image, which is a two-dimensional function $I(x,y)$, where x and y are the coordinate of each image point respectively in the longitudinal and the lateral dimensions, a field of gradient vectors, deriving a set of tangent values orthogonal to the gradient vectors thus produced, and constructing from said set of tangent values a field of flow-lines having as their tangent at every point said tangent values.

16. The method of claim 15, wherein said field of gradient vectors is produced by applying a convolution mask to the image.

17. The method of claim 16, further comprising the step of filtering the field of gradient vectors by squaring the gradient vectors and Gaussian filtering the squared gradient vectors prior to deriving the set of tangent values.

18. The method of claim 10, wherein said description is a dipmeter plot.

19. The method of claim 9, wherein step (d) of combining the subsets of flow-lines comprises the steps of:
(d1) forming a first set of flow-lines by selecting for each flow-line in the first subset, one flow-line in the further subset, and denoting said flow-line from the first subset a root flow-line the selection being based on at least one criterion indicative of the likelihood that said first set of flow-lines shows the same bed boundary,
(d2) repeating step (d1) to form other sets of flow-lines by successively taking as the root flow-line the flow-lines selected as a result of step (d1),
(d3) retaining said first set of flow-lines as a set of connected flow-lines where the sets formed as a result of steps (d2) are identical with said first set, and
(d4) selecting as a set of connected flow-lines, among the sets resulting from steps (d1) and (d2), the set which optimizes a likelihood to show the same bed boundary where one of the sets formed as a result of set (d2) is different from said first set.

20. The method of claim 19, wherein step (d1) comprises the steps of determining an average direction of the flow-lines of all the images within a predetermined window centered at said root flow-line, and selecting in said further subset the flow-line which is closest to said average direction.

21. The method of claim 19, wherein step (d1) comprises the step of selecting in the further subset the flow-line for which the variations of said physical parameter along the longitudinal direction within a predetermined window is most similar to the variations of the physical parameter shown by the root flow-line.

22. The method of claim 19, wherein step (d1) comprises the steps of:
(i) determining an average direction of the flow-lines of all the images within a predetermined window centered at said root flow-line, and selecting in each of said other subsets the flow-line which is closest to said average direction,
(ii) selecting in each of the other subsets the flow-line for which the variations of said physical parameter along the longitudinal direction, within a predetermined window, are most similar to that of the root flow-line,
(iii) retaining the set of flow-lines resulting from step (i) when it is identical with the set resulting from step (ii),
(iv) selecting among said sets of flow-lines the set to be retained by applying a test comprising a combination of at least the test of step (i) and the test of step (ii) if the sets resulting from step (i) and step (ii) are different.

* * * * *